(12) United States Patent
Chan et al.

(10) Patent No.: US 6,192,433 B1
(45) Date of Patent: Feb. 20, 2001

(54) AUTOMATIC SCSI TERMINATION READJUSTMENT

(75) Inventors: Wing Chan; David L. Griffith, both of Pleasanton, CA (US)

(73) Assignee: Tandem Computers Incorporated, Cupertino, CA (US)

( * ) Notice: Under 35 U.S.C. 154(b), the term of this patent shall be extended for 0 days.

(21) Appl. No.: 09/115,144

(22) Filed: Jul. 14, 1998

(51) Int. Cl.$^7$ ................................................ G06F 13/00
(52) U.S. Cl. ........................................................ 710/101
(58) Field of Search .................................. 710/101–103

(56) References Cited

U.S. PATENT DOCUMENTS

| | | | | |
|---|---|---|---|---|
| 5,467,453 | * | 11/1995 | Kocis | 395/281 |
| 5,564,024 | * | 10/1996 | Pemberton | 395/283 |
| 5,586,271 | * | 12/1996 | Parrett | 395/283 |
| 5,596,757 | * | 1/1997 | Smith | 395/750 |
| 5,613,074 | * | 3/1997 | Galloway | 395/280 |
| 5,628,637 | * | 5/1997 | Pecone et al. | 439/74 |
| 5,680,555 | * | 10/1997 | Bodo et al. | 395/306 |
| 5,748,910 | * | 5/1998 | Herrera E. | 395/281 |
| 5,751,977 | * | 5/1998 | Alexander | 395/306 |
| 5,758,101 | * | 5/1998 | Pemberton | 395/283 |
| 5,919,253 | * | 7/1999 | Schneider | 710/103 |
| 5,920,266 | * | 7/1999 | Allgood et al. | 340/825.05 |
| 5,983,296 | * | 11/1999 | Lamkin et al. | 710/100 |
| 6,029,216 | * | 2/2000 | Hoglund et al. | 710/101 |
| 6,047,379 | * | 4/2000 | Larabell et al. | 713/300 |
| 6,055,582 | * | 4/2000 | Pascarella et al. | 710/14 |
| 6,061,754 | * | 5/2000 | Cepulis et al. | 710/126 |

* cited by examiner

Primary Examiner—John A. Follansbee
(74) Attorney, Agent, or Firm—Townsend and Townsend and Crew LLP

(57) ABSTRACT

An on line serviceable computing system employing a small computer system interface (SCSI) bus architecture connecting two host computers to at least one additional shared device including a termination adapter circuit that can sense when a SCSI termination at the end of the SCSI bus is lost and automatically switch in a new SCSI bus termination to thereby ensure that the bus is terminated at both ends as required for continuous operation.

4 Claims, 1 Drawing Sheet

AUTOMATIC SCSI TERMINATION READJUSTMENT

BACKGROUND OF THE INVENTION

The present invention relates generally to computing systems with bus-connected peripheral devices, and more particularly to systems using small computer system interface (SCSI) bus structures.

An important and valuable part of any computing system today is its external storage facility. The presently preferred form of external storage is some type of hard disk structure because of its random access capability although other forms (e.g., tape, CD-ROM) are also used. This type of external storage is often used as (or called) mass storage. Mass storage which, as the name implies, is used to retain for later access huge amounts of data. When later accessed it is advantageous that the access be made as quickly as possible. While there are a number of bus architectures capable of connecting a processor unit to such mass storage devices, one that is very flexible and powerful, particularly for connecting hard disk mass storage devices, is the small systems computer interface (SCSI).

The physical SCSI bus structure comprises a set of conductive signal lines that carry data and control signals for information transfer between the devices on the bus. Signals and data are communicated according to pre-determined protocols. (See, for example, Working Document for Information Technology SCSI Parallel Interconnect 2 (SPI-2), ANSI X3.302.)

One well-known physical characteristic of SCSI bus structures is that the signal lines forming the bus are terminated by an SCSI bus terminator at each end of the bus. If there are multiple devices connected to the bus and the SCSI terminators are built into the last device at each end of the bus, then problems can occur when the last SCSI device on the bus must be removed or shut down. Removal/disconnection of the last device with the terminator degrades the signals communicated on the SCSI bus so that the entire system is brought down. In order to continue operation, the SCSI termination must be moved to the next in line last device on the bus.

This problem can also occur if the connection of the last device is inadvertently disconnected, the entire system will again be affected because the communicating ability of the SCSI bus is lost.

SUMMARY OF THE INVENTION

The present invention provides a method, and apparatus for implementing that method, that allows for on-line service of a failed element located at the end of a SCSI bus which included the SCSI cable terminator.

The invention is described in the context of a computing system in which processor units are coupled to peripheral devices (e.g., storage units) by a SCSI bus architecture. According to the present invention, there is provided each device immediately next to the system element that forms the last in line on the bus (i.e., the one with the SCSI cable terminator) a termination adapter circuit. In the event the last device is removed or looses power, the termination adapter circuit will sense that removal or loss of power and automatically disconnect the SCSI bus connection to the former last device and connect a new SCSI terminator. This immediate proximate device then forms the last device on the SCSI bus, providing the requisite SCSI bus termination.

Conventionally, a SCSI bus structure includes, among the signal lines implementing that structure, the signal "Termination Power" (TERM PWR), a 5 volt signal that supplies current to the terminators at the end of the SCSI bus. In a preferred embodiment of the invention, TERM PWR is monitored by a termination adapter circuit located in association with that device next in line on the SCSI bus to the device lost on the SCSI bus, i.e., the one with the built in SCSI bus terminator. Should that last device loose power, or the connection to the last SCSI device is interrupted, the TERM PWR signal will be lost. The loss of TERM PWR will be noted by the termination adaptor circuit, causing it to switch in a new SCSI bus terminator and electronically disconnect the bus to the former last device. Thereby, the SCSI bus for data transfers remains.

The implementation is symmetric; the termination adaptor is located in each of those devices immediately proximate the next in line from the last devices on the SCSI bus. Therefore, the loss of a device on either end of the SCSI bus follows a similar procedure.

A number of advantages are achieved by the present invention. First, an end device such as a CPU can be removed from the SCSI bus, or shut down for repair, without having to shut down the entire system connected to the SCSI bus even temporarily. Thus the remaining CPU can continue to operate.

Further, should the SCSI bus cable that connects to the last device on the bus be disconnected, the entire system is not caused to fail.

This invention is particularly useful in non-stop computer systems that require repair while the rest of the system continues to operate.

These and other advantages and aspects of the invention will become apparent to those skilled in the art upon a reading of the following detailed description of the invention, which should be taken in conjunction with the accompanying drawings.

DESCRIPTION OF THE PREFERRED EMBODIMENT

Figure 1:
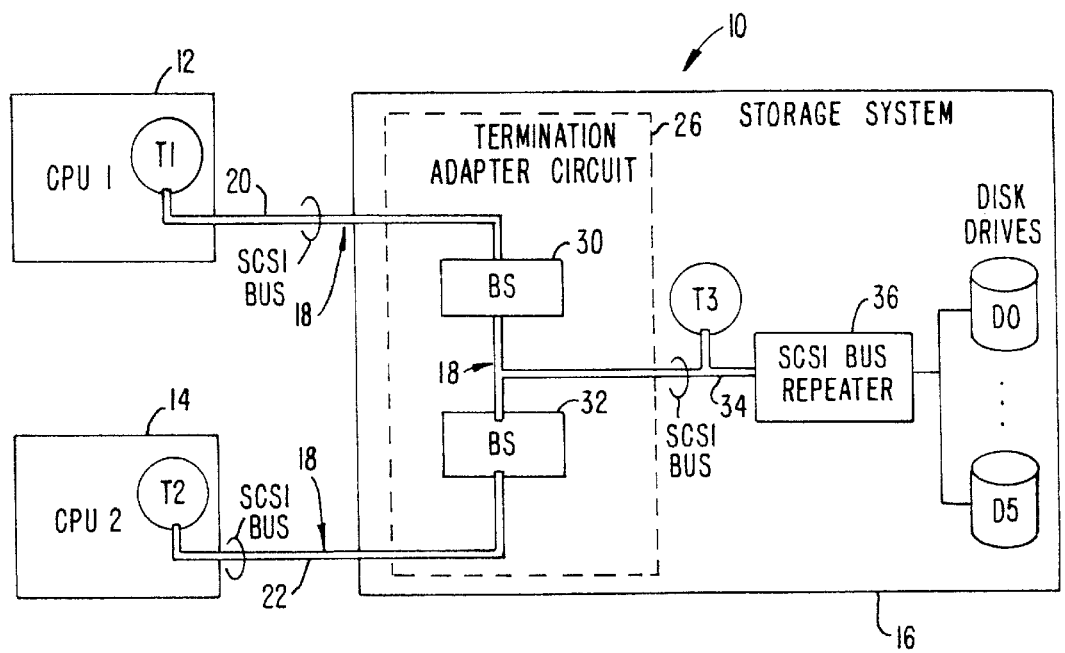
FIG. 1 illustrates employment of the invention in a processing system architecture having two host central processor units connected, by a SCSI bus architecture, to a storage system comprising a box of disk drive units.

Turning now to the figures, and for the moment specifically FIG. 1, there is illustrated a processing system, designated generally with the reference numeral 10, comprising a pair of central processor units (CPUs) 12, 14 connected to a mass storage system 16 by SCSI bus cables 20, 22. SCSI bus 18 comprises SCSI bus cables 20 and 22 and SCSI bus segment 34. The two CPUs 12 and 14 (used for reliability reasons) form the end devices for the SCSI bus 18, and therefore will contain SCSI bus terminators ($T_1$, $T_2$) as required for terminating the ends of the bus. As will be seen, the invention operates to allow the system to continue to operate should either of the CPUs 12, 14 be turned off, lose power, or otherwise disconnected from the storage system 16.

SCSI bus 18 is terminated at its ends, i.e., at each CPU 12, 14, in conventional fashion by the SCSI bus terminators T1 and T2. The SCSI cables 20, 22, connect, through a termination adapter circuit 26, comprising bus switches (BS) 30, 32 to SCSI bus segment 34. The SCSI bus segment 34 couples the termination adapter circuit 26 to storage devices (disk drives) D0–D5 through a SCSI bus repeater 36.

In operation, data transfers are executed between the CPUs 12, 14 and the disk drives D0–D5 in conventional fashion, according to standard SCSI protocol, using the SCSI bus cables 20, 22, and bus segment 34 as the communicating medium. If, however, one of the CPUs 12, 14, loses power, or its associated cable 20, 22 becomes disconnected, this loss of power or disconnected cable will be detected by circuitry (described below) contained in the termination adapter circuit 26. The termination adaptor 26, sensing this loss/disconnection, will then operate to electronically disconnect the cable 20 or 22 (thereby disconnecting the associated SCSI bus terminator T1 or T2). And, at the same time it will electronically connect the SCSI bus terminator impedance T3 to the remainder of the SCSI bus 18 so that the SCSI bus architecture again has terminations at each end of the bus structure. Should the CPU 12, 14 that lost power, or was disconnected, be re-powered or connected, the termination adapter circuit 26 will also sense that circumstance, and accordingly disconnect the SCSI bus terminator T3, and electronically re-connect the cable 20 or 22 to the SCSI bus segment 34, thereby reconnecting the previously lost CPU 12 or 14 with its associated termination resistance T1 and T2.

Figure 2:
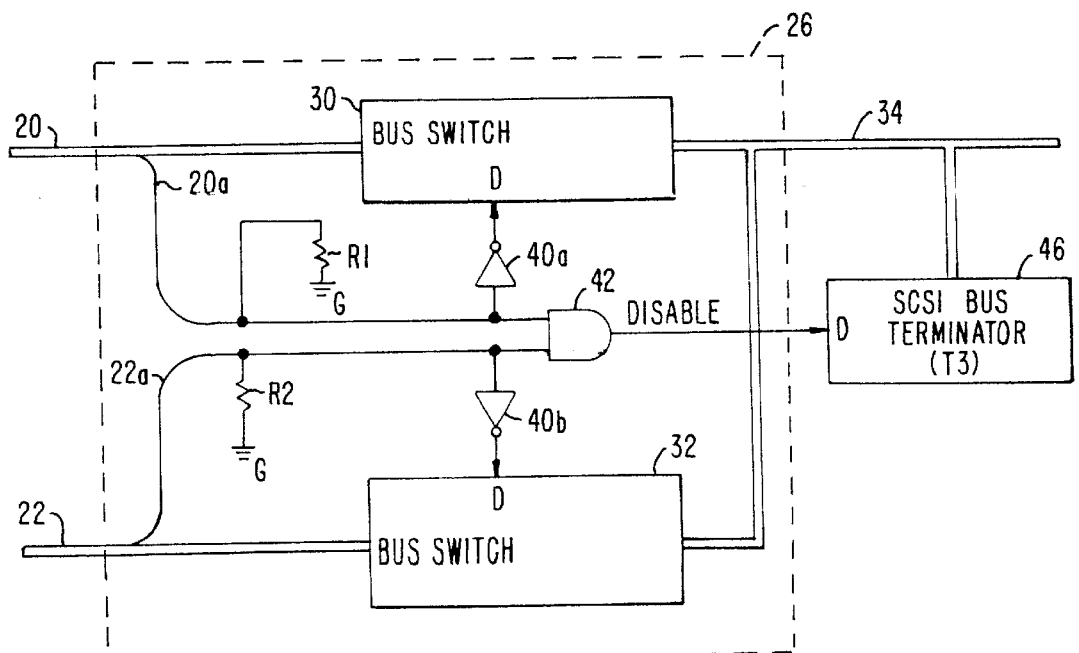
FIG. 2 illustrates the termination adaptor circuit that forms a part of the storage system of FIG. 1 to switch to a new SCSI bus terminator and electronically disconnect the bus to the former last device, should one of the end units be disconnected or lose power.

FIG. 2 shows the termination adapter circuit 26 in greater detail. Typically, SCSI bus constructions are implemented to carry a positive 5 volt (DC) termination power (TERM PWR) signal. As shown in FIG. 2, the signal lines 20a, 20b from the SCSI cables 20, 22, respectively, carrying TERM PWR supplied by 12 and 14 are brought out in the termination adapter circuit 26 and applied to inverter-drivers 40 (40a, 40b) and to an AND gate 42. In addition, pull down resistors R1 and R2 connect the signal lines 20a, 22a to a ground potential (G).

The outputs of the inverter-drivers 40a, 40b respectively connect to the disable (D) inputs of the bus switches 30, 32. The output of the AND gate, carrying a DISABLE signal, connects to the disable (D) input of a SCSI bus terminator T3 46.

The SCSI bus terminator 46 provides the requisite impedances (resistors) to terminate a SCSI bus when operating in a "connect" mode (i.e., when the DISABLE signal from the AND gate is HIGH). The SCSI bus terminator 46 will assume a second, a "disconnect," mode to disconnect the terminating impedances when the DISABLE signal is LOW. An example of such a terminator is that produced by Unitrode Corporation of Merrimac, N.H., and sold under the part number UC5608. (For convenience the terminator is also used for the SCSI bus terminators T1 and T2, although only in the first mode.)

In operation, i.e., when the CPUs 12, 14 are powered normally, and the SCSI bus cables 20, 22 are connected between the CPUs and the storage system 16 (FIG. 1), the signal lines 20a, 22a, will be carrying the positive 5 volt TERM PWR signal. Accordingly, the disable (D) inputs of the bus switches 30, 32 will receive a LOW from the inverter-driver elements 40 which, in effect, "enables" each bus switch so that the signals on the SCSI bus cables 20, 22 are communicated to the SCSI bus segment 34. In addition, the two TERM PWR signals are applied to the AND gate 42 to produce a logic HIGH that, when applied to the disable (D) input of SCSI terminator T3 (element 46), disables SCSI Terminator T3. When disabled, the SCSI terminator T3 is disconnected from the SCSI bus segment 34.

Now assume that the CPU 12 either looses power or, for whatever reason, the SCSI bus cable 20 is disconnected from either the CPU 12 or the storage system 10. This will cause an absence of the TERM PWR signal carried by the signal line 20a. This loss of TERM PWR will, through the pull down resistor R1, cause the input to the inverter-driver element 40a to go LOW, driving its output HIGH. The now HIGH signal at the output of the inverter-driver 40a will be applied to the (D) input of the bus switch 30. This causes the bus switch 30 to respond by electronically disconnecting the SCSI signal lines of the SCSI cable 20 from the SCSI bus segment 34. At the same time, the absence of the 5 volt TERM PWR signal will disable the AND gate 42 to produce the DISABLE signal that is applied to the disable (D) input of the SCSI bus Terminator 46. In response, the SCSI bus Terminator 36 will electronically connect termination resistances to the SCSI bus segment 34. Thus, the loss of the SCSI bus termination T1 has been replaced with the SCSI bus termination 46 (T3). The storage system 16 and the CPU 14 now are the end devices of the SCSI bus 18.

As indicated above, the operation is symmetric. That is, should CPU 14 loose power, or the SCSI bus cable 22 become disconnected, the bus switch 32 will react to the loss of the TERM PWR signal carried by the signal line 22a in the same manner: bus switch 32 will, in effect, disconnect the SCSI bus cable 22 from the SCSI bus segment 34, and, in the same manner as described above, electronically connect the SCSI bus termination resistance T3 to the SCSI bus segment 34.

The bus switches 30 and 32 may be a high-speed CMOS 10-bit bus switch such as manufactured by Quality Semiconductor Incorporated of 851 Martin Avenue, Santa Clara, Calif., part number QS3384, QS32384. The SCSI Bus Repeater 36 can be a repeater/converter device manufactured by Simbios Logic of Fort Collins, Colo. (manufactured under the part number SYM53C120).

For cost, simplicity, and to maintain the integrity of the SCSI bus connections, the SCSI terminations T1 and T2 are preferably built into the CPUs at the end of the SCSI chain. External terminations would allow a maintenance person to inadvertently remove the terminator and not replace it. Notice that when a SCSI cable 20 or 22 is removed from either CPU for the service of that CPU, the built-in termination T1 or T2 is removed at the same time. This would bring down an ordinary system, but not with employment of the present invention.

For the same reasons, the SCSI bus termination 46 (T3) is built into the mass storage system 16 so that the SCSI chain is not broken by accidentally removing the termination T3 while a cable is disconnected or removed.

There are generally three types of SCSI terminations in use today; single ended, high voltage differential and low voltage differential. The present invention is independent of, and can work with, any kind of termination. However, as those skilled in this art will recognize, the bus switches 30 and 32 will need to be compatible with the electrical characteristics of the SCSI bus.

What is claimed is:

1. A processing system including a pair of central processing units (CPUs) and a storage unit interconnected for data communication by first and second small computer system interface (SCSI) bus segments that respectively connect each of the pair of CPUs to the storage unit, the first and second SCSI bus segments carrying termination power signals, apparatus for providing impedance terminations at the storage unit in the event the SCSI bus connecting the storage unit to one of the pair of CPUs is disconnected, or one of the pair of CPUs losses power, the apparatus comprising:

first and second bus switch units respectively coupling the first and second SCSI bus segments to a third SCSI bus segment, the first and second bus switch units being connected to receive the termination power signals;

a SCSI termination circuit coupled to receive the termination power signals;

whereby, when the termination power signal is absent from the first SCSI bus segment, the first bus switch unit de-couples the first SCSI bus from the storage unit and the SCSI termination circuit couples a SCSI termination impedance to the third SCSI bus segment.

2. In a computing system including a pair of central processing units (CPUs) and a storage system, a fault tolerant connection of the pair of CPUs to the storage system by a small computer system interface (SCSI) bus structure, the connection comprising:

first and second SCSI bus elements connecting corresponding ones of the CPUs to the storage system, the first and second SCSI bus elements each including a termination power signal;

a third SCSI bus element associated with the storage element;

a pair of bus switch elements electrically coupling corresponding ones of the first and second SCSI bus elements to an end of the third SCSI bus element;

a terminating impedance selectively coupled to the other end of the third SCSI bus element; and a sense circuit connected to receive the termination power signal of the first and second SCSI bus elements to electrically connect the terminating impedance to the other end of the third SCSI bus element in absence of the termination power signal from the first CPU or the second CPU.

3. A method of fault tolerant interconnection of a pair of processing units to a storage system, the method including the steps of:

connecting each of the pair of processing units to the storage system by a first and a second small system computer interface (SCSI) bus;

connecting one end of a third SCSI bus to the storage system and the other end of the third SCSI bus to each of the first and second SCSI busses through a corresponding one of a pair of switch units;

sensing a termination power signal from each of the pair of processing units to disconnect the first or second SCSI bus of the corresponding processing unit not providing the terminal power signal; and connecting at the one end of the third SCSI bus a terminating impedance when the terminal power from the first or the second processing unit is absent.

4. A fault tolerant small system computer interface (SCSI) system for interconnecting a pair of processors and a storage unit to one another for data communication, the system operating to reestablish bus terminations in the event of a failure of a one of the pair of processors, the system comprising:

a first SCSI bus having one end connected to a one of the pair of processors;

a second SCSI bus having one end connected to the other of the pair of processors;

a third SCSI bus having one end connected to the storage unit and to a terminator which can be electrically connected to the one end of the third SCSI bus;

a bus switch connected to the first, second, and third SCSI busses to receive from each of the pair of processors first and second termination power signals respectively, the bus switch operating in a first mode when the first and second termination power signals are present to couple the first and second SCSI busses to the third SCSI bus, and in a second mode when the first termination power signal is absent to connect only the second SCSI bus to the third SCSI bus and to cause the terminator to electrically connect to the third SCSI bus.

* * * * *